June 17, 1941. G. T. DOWNEY 2,246,436
SEALED PIPE JOINT
Filed Feb. 14, 1941
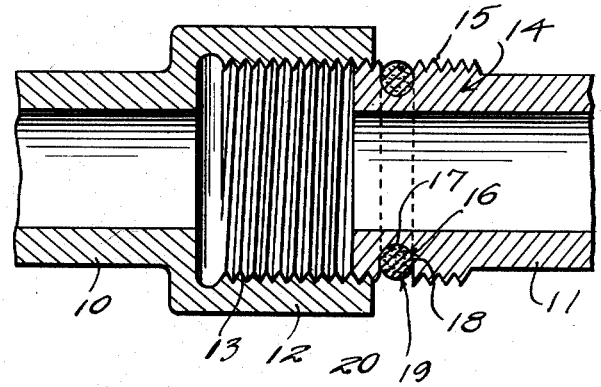
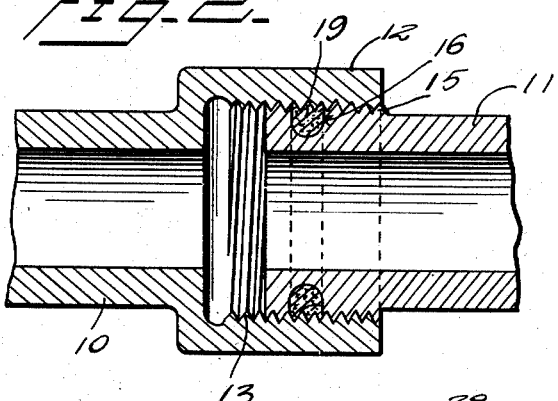
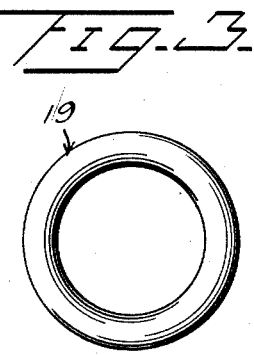
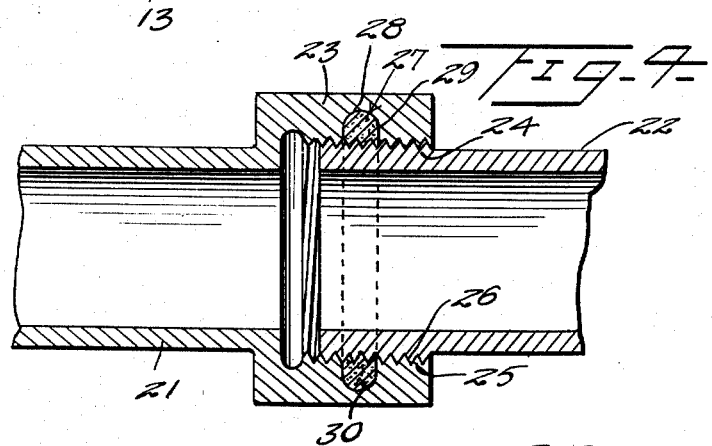
Inventor
G. T. Downey
By Kimmel & Crowell
Attorneys Patented June 17, 1941

2,246,436

UNITED STATES PATENT OFFICE 2,246,436

SEALED PIPE JOINT

George T. Downey, Corry, Pa., assignor to Aero Supply Mfg. Co. Inc., Corry, Pa.

Application February 14, 1941, Serial No. 378,983

1 Claim. (Cl. 285—154)

This invention relates to pipe joints and more particularly to an improved means for sealing the joint between a pair of pipes.

An object of this invention is to provide an improved joint for a pair of pipe sections which is so constructed that an effective seal will be formed between the pipe sections as they are coupled together.

Another object of this invention is to provide an improved joint of this kind wherein the pipe sections will be sealed together before the sections are tight.

A further object of this invention is to provide a joint of this kind wherein the seal may be removed for replacement without completely uncoupling the pipe sections so that a minimum of fluid will be lost during the replacement of the seal.

A further object of this invention is to provide a joint wherein the threading of the pipe sections together will distort the seal so as to provide a fluid tight joint irrespective of whether the joint is tight or slightly loose.

A further object of this invention is to provide in a pipe coupling a sealing member having an arcuate surface for engagement with the threads of one part of the coupling so that when the two parts of the coupling are moved to a coupling position the rounded surface of the sealing member will prevent longitudinal movement thereof and facilitate the proper distortion of the sealing member into the valleys of the threads.

To the foregoing objects and to others which may hereinafter appear, the invention consists of the novel construction, combination and arrangement of parts as will be more specifically referred to and illustrated in the accompanying drawing wherein is shown embodiments of the invention, but it is to be understood that changes, variations and modifications may be resorted to which fall within the scope of the invention as claimed.

In the drawing:

Figure 1 is a fragmentary longitudinal section of a pipe coupling constructed according to an embodiment of this invention, the coupling members being shown in partly coupled position, Figure 2 is a view similar to Figure 1 but showing the coupling members in completely coupled and sealed position, Figure 3 is a side elevation of the sealing member used with this coupling, and Figure 4 is a fragmentary longitudinal section of a modified form of coupling means.

Referring to the drawing, the numerals 10 and 11 designate a pair of pipe sections which are adapted to be coupled together. The pipe section 10 is provided with a cylindrical coupling member 12, which is substantially larger in diameter than the pipe section 10 and which is provided on the interior thereof with threads 13.

The pipe section 11 is provided with a coupling member 14, which in the present instance is formed integral with the pipe 11 and includes a plurality of exterior or peripheral threads 15, which are adapted to engage within the threads 13 of the coupling member 12. The coupling member 14 at a point between the ends of the threads 15 is provided with an annular groove 16, which has a bottom wall 17 transversely arcuate in configuration. The side walls 18 of the groove 16 are in parallel relation. A yieldable sealing element 19, which as shown in Figure 3 is of ring shape and is round in transverse section is adapted to snugly seat in the groove 16. The sealing member 19 is of a diameter in transverse section sufficient to snugly engage within the groove 16 and the groove 16 is of such a depth that the arcuate outer surface 20 of the sealing member 19 projects slightly outwardly of the outer edges of the side walls 18 of the groove 16. The sealing member 19 has an exterior diameter substantially equal to the outer diameter of the peaks of the threads 15 and as shown in Figure 1 the arcuate outer surface 20 of the sealing member 19 provides a means whereby when the coupling member 12 is moved to a coupling position the leading thread will ride up over the arcuate surface 20 and distort the projecting portion of the sealing member 19 so that the projecting portion of the sealing member 19 will be distorted into the valleys of the threads 13, as shown in Figure 2.

When the two coupling members 12 and 14 are moved to a coupling position and when the coupling member 12 passes over the sealing member 19, a fluid tight joint is provided between the two coupling members 12 and 14 irrespective of whether the coupling members 12 and 14 are tightly coupled together or whether the two coupling members are relatively loose. This is due to the fact that the compressible or yieldable sealing member 19 will completely fill the valleys of the threads 13 and will also be compressed into the groove 16.

In Figure 4 there is disclosed a slightly modified form of this coupling wherein a pipe section 21 is coupled to a pipe section 22 by means of coupling members 23 and 24. The coupling member 23 is similar to the coupling member 12, being provided with interior threads 25 and the coupling member 24 is provided with peripheral or exterior threads 26. The threads 26 are adapted to engage the threads 25 and in order to provide a means whereby the two coupling members 23 and 24 may be sealed to make a fluid tight joint the outer coupling member 23 is provided with an annular groove 27. The annular groove 27 is provided with an arcuate bottom wall 28 and with parallel side walls 29. A ring shaped or annular sealing member 30 similar in every detail to the sealing member 19 is adapted to seat in the groove 27 and the inner periphery of the sealing member 20 is arcuate in transverse section and also projects inwardly of the groove 27. The inner diameter of the sealing member 30 is substantially equal to the inner diameter of the inner threads 25 and initially the sealing member 30 presents a transversely arcuate surface over which the outer threads 26 are adapted to engage, so that when the inner threads 26 pass over the sealing member 30 the sealing member 30 will be distorted, as shown in Figure 4, in such a manner that the distorted portion of the sealing member 20 will completely fill the valleys of the threads 26 which overlap or overlie the groove 27. In this coupling as with the coupling shown in Figures 1 and 2, the joint between the coupling members 23 and 24 is thoroughly sealed against leakage of any fluid in the pipes 21 and 22 as soon as the inner coupling member 24 overlaps and distorts the sealing member 30.

With a coupling of this kind it is not necessary that the two coupling members be tightened together in order to form a fluid tight joint. While in normal use the two coupling members 12 and 14 will be drawn up tight together so that the two pipe sections 10 and 11 will not move or rotate one relative to the other. Nevertheless in the event this coupling becomes slightly loosened through vibration or the like, the fluid will not be able to leak out between the threads due to the compression of the sealing member 19, which snugly engages in the groove 16 and also snugly engages in the valleys of the threads 13.

In addition to the foregoing when it is desired to replace the sealing member 19 this may be done without completely uncoupling the coupling members 12 and 14. The sealing member 19 may be slipped onto the pipe section 11 from the opposite end thereof, or if desired the sealing member 19 may be initially split and then positioned about the pipe section 11 and subsequently vulcanized together so as to form a complete ring. It will be understood that in normal usage, the sealing member 19 is continuous and is not split. The sealing member 19 is preferably constructed out of rubber composition or a synthetic product similar to rubber which will readily become distorted when the coupling members are moved to a coupling position.

One use of this coupling structure is in a gasoline pipe line leading from a supply tank to the carburetor or pump of an internal combustion engine used in an airplane where the vibrations of the engine frequently cause the conventional coupling members to become loosened. However, due to the fact that this coupling structure is completely sealed before the coupling members are moved to a completely coupling position, the coupling structure hereinbefore described will form a fluid tight joint irrespective of whether the coupling members are tightly coupled together or whether the coupling members are subsequently loosened due to vibration or the like.

Furthermore by providing the arcuate surface on the sealing member which is engaged by one of the coupling members when the two coupling members are threaded together so that one of the coupling members will overlie the sealing member, the provision of the arcuate thread engaging portion of the sealing member will prevent any crowding or longitudinal movement of the sealing member during the movement of the coupling members to a coupling position. It is known that sealing means has heretofore been provided in a joint, but the sealing means heretofore available has been constructed rectangular in transverse section and when the coupling members have been moved to a coupling position the configuration of the sealing member is such that there is a crowding, pushing or longitudinal movement of the sealing member which has resulted in damage to the sealing member rather than a distortion of the sealing member into the valleys of the threads. As heretofore stated, the sealing member hereindisclosed presents an arcuate or tapered surface to the threads of the overlapping coupling members so that the overlapping coupling member will readily ride over the arcuate surface of the sealing member and will not cause a crowding of the sealing member with longitudinal movement thereof and possible damage to the sealing member. With a sealing member as hereinbefore described the projecting surface of the sealing member is readily distorted into the valleys of the threads without any material damage to the sealing member and without any longitudinal movement of the sealing member.

What I claim is:

A sealed joint comprising inner and outer tubular coupling members for connection together in telescopic relation, said inner member being formed at one terminal portion thereof with threads on its outer periphery, said outer member being formed at one end terminal portion thereof with threads on its inner periphery for engagement with said outer threads when said members are in telescopic relation, one of said members being formed intermediate the ends of its threads with an annular groove, and a ring-shaped distortable sealing member seated in said groove and having a transversely rounded surface projecting outwardly of said groove to a point beyond the base of the threads on said one member whereby the threads of the other member will move over said surface and distort the latter into the valleys of the threads of the said other member without mutilation of said surface to provide a seal upon the connecting of one coupling member to the other.

GEORGE T. DOWNEY.